(12) United States Patent
Maness

(10) Patent No.: US 11,028,964 B2
(45) Date of Patent: Jun. 8, 2021

(54) TELESCOPE TRIPOD HOLDER FOR CHEST

(71) Applicant: Michael Glenn Maness, Woodville, TX (US)

(72) Inventor: Michael Glenn Maness, Woodville, TX (US)

(*) Notice: Subject to any disclaimer, the term of this patent is extended or adjusted under 35 U.S.C. 154(b) by 0 days.

(21) Appl. No.: 16/792,279

(22) Filed: Feb. 16, 2020

(65) Prior Publication Data
US 2020/0408356 A1 Dec. 31, 2020

(51) Int. Cl.
| | | |
|---|---|---|
| *B65D 81/05* | (2006.01) | |
| *F16M 11/32* | (2006.01) | |
| *G02B 23/16* | (2006.01) | |
| *F16M 11/24* | (2006.01) | |

(52) U.S. Cl.
CPC ............ *F16M 11/32* (2013.01); *B65D 81/05* (2013.01); *F16M 11/242* (2013.01); *G02B 23/16* (2013.01); *F16M 2200/08* (2013.01)

(58) Field of Classification Search
CPC .. F16M 11/32; F16M 11/242; F16M 2200/08; G02B 23/16; G12D 9/08; B65D 81/05; B65D 25/108; B65D 25/10; B65D 85/38; B65D 9/06; A45C 11/08; A45C 13/02
USPC ............ 206/765, 763, 588, 590; 217/36, 49
See application file for complete search history.

(56) References Cited

U.S. PATENT DOCUMENTS

| | | | | |
|---|---|---|---|---|
| 239,617 | A * | 4/1881 | Monroe ................. | G10G 7/005 206/14 |
| 629,235 | A * | 7/1899 | Canale ...................... | B65D 9/32 217/36 |
| 1,513,117 | A * | 10/1924 | Ludlow .................. | B65D 85/38 217/52 |
| 1,670,752 | A * | 5/1928 | Smith ...................... | B65D 9/26 217/128 |
| 2,249,270 | A * | 7/1941 | Boeye .................... | B65D 85/68 206/319 |
| 2,458,695 | A * | 1/1949 | Edelston .................. | B41J 29/13 206/765 |
| 3,871,546 | A * | 3/1975 | Thompson ............. | B65D 85/68 217/38 |
| 4,531,632 | A * | 7/1985 | Weber .................... | G10G 7/005 206/14 |
| 5,964,524 | A * | 10/1999 | Qian ....................... | F21V 21/06 248/170 |
| 6,926,428 | B1 * | 8/2005 | Lee .......................... | B25H 3/02 362/154 |
| 10,443,273 | B2 * | 10/2019 | Harring ............... | E05B 73/0082 |

(Continued)

*Primary Examiner* — Ingrid M Weinhold

(57) ABSTRACT

Tripod Holder is a device that consists of two supports that are secured to a chest (or footlocker). One support holds the tripod base, and the other support holds the tripod legs. Both supports are secured to the bottom and sides of the chest. One support is fixed with a T-nut from the back; thus using the tripod base's own bolt (that secures the tripod's base to the scope mount), the bolt can be used to secure the tripod's base to one support. Once the tripod based is fixed, the three legs extend out and rest on the other support at multiple contact points. The 10-degree angle of the tripod base's support allows the legs to rest slightly to the top of the chest maximizing available space in the chest. With these two supports securing the tripod legs, via a strap, the legs do not disturb the other scope parts inside the chest, allowing for secure storage during travel.

6 Claims, 3 Drawing Sheets

(56) References Cited

U.S. PATENT DOCUMENTS

| | | | |
|---|---|---|---|
| 2012/0067752 A1* | 3/2012 | Bohurjak | F16M 11/34 206/320 |
| 2015/0330558 A1* | 11/2015 | Intravatola | F16M 11/28 362/184 |
| 2018/0079580 A1* | 3/2018 | Midali | B65D 81/113 |
| 2018/0355638 A1* | 12/2018 | Harring | A45C 11/00 |

* cited by examiner

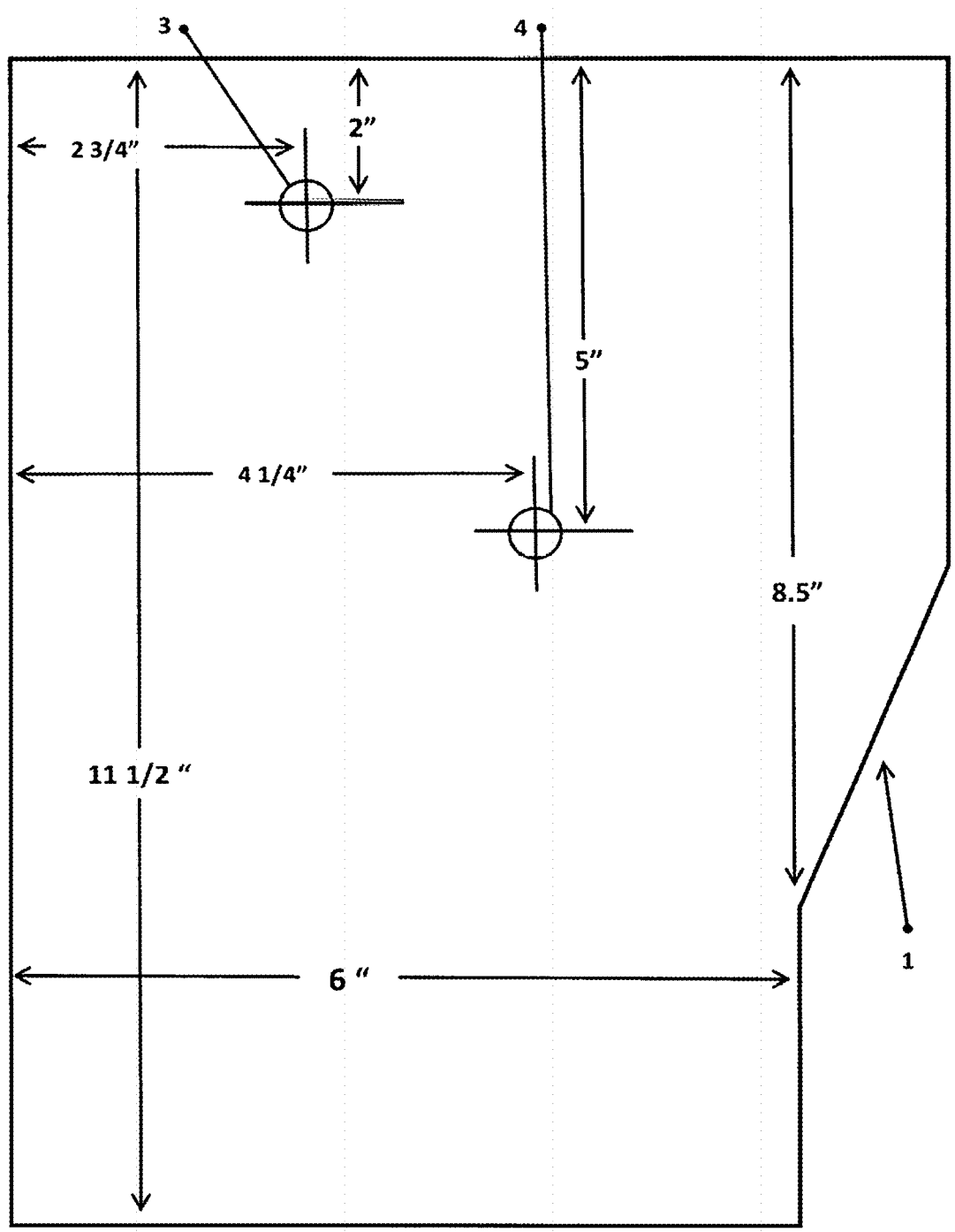
Figure #1

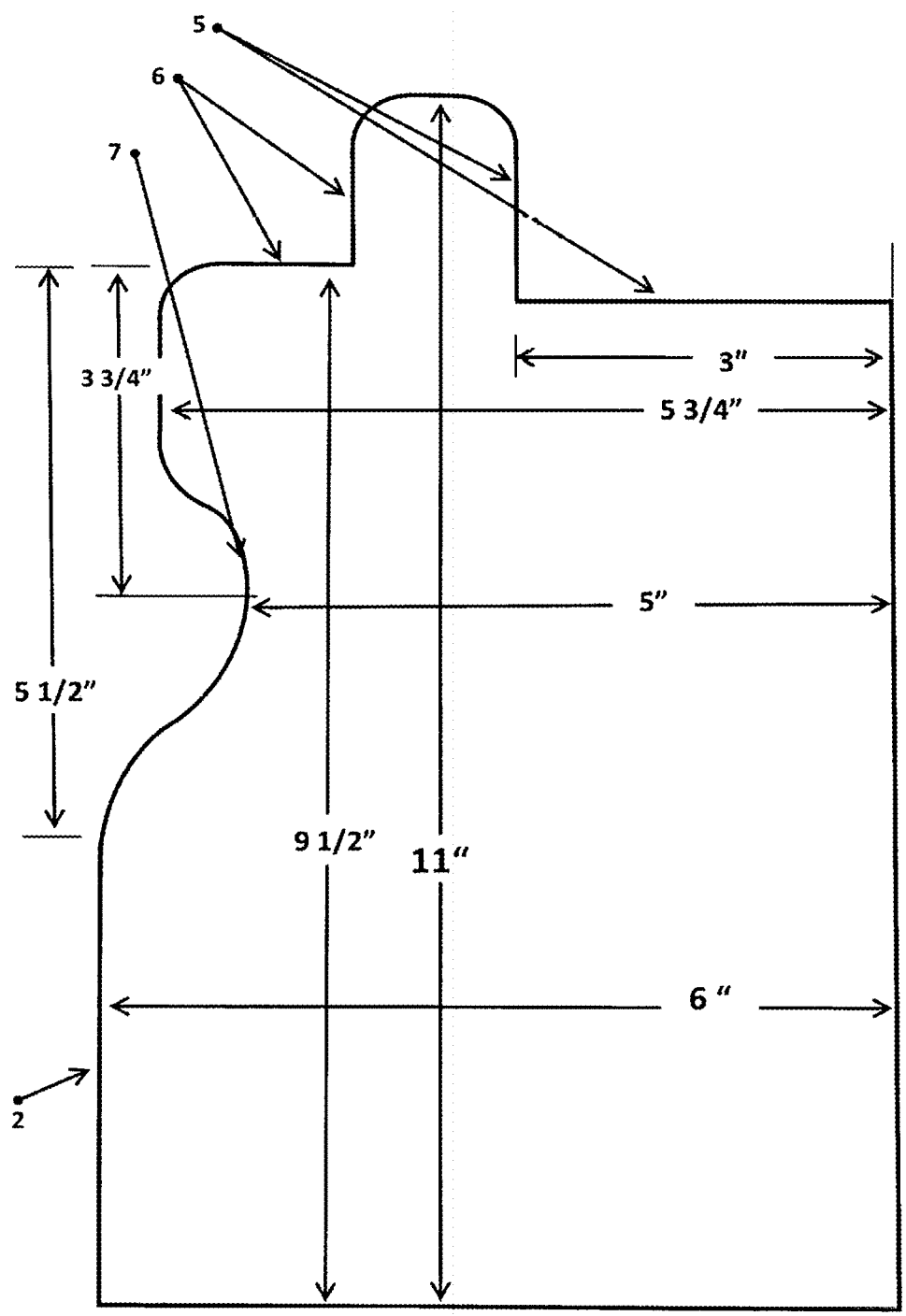
Figure #2

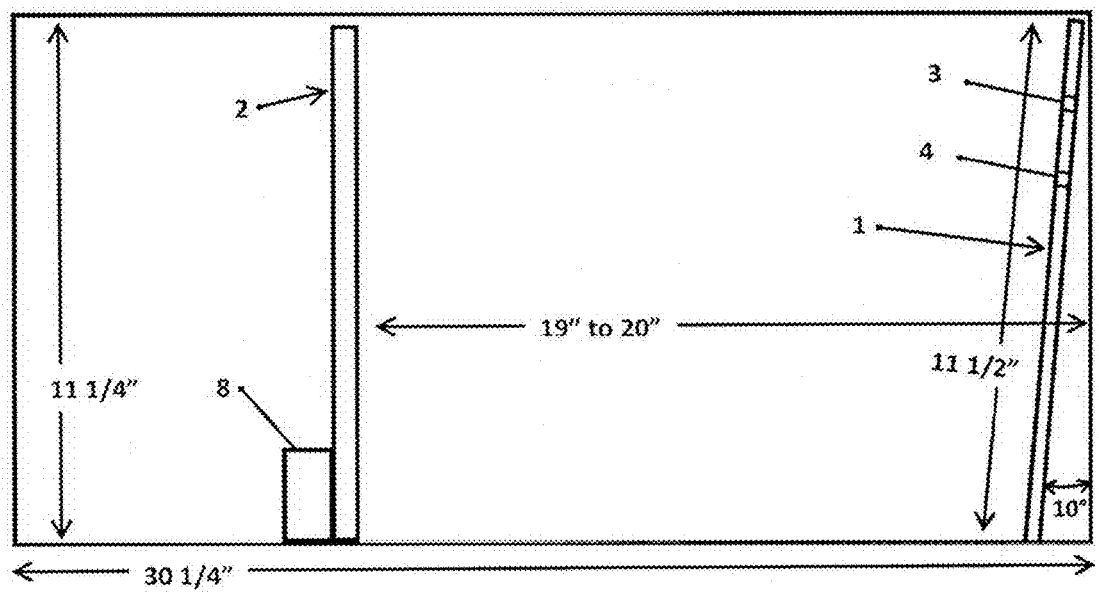
Figure #3
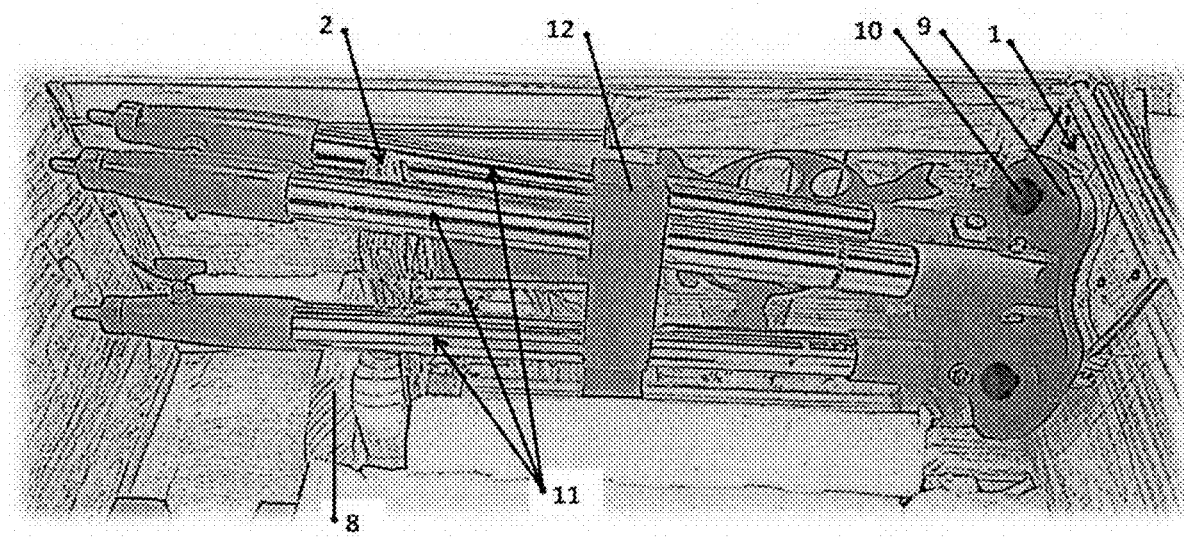
Figure #4

TELESCOPE TRIPOD HOLDER FOR CHEST

BACKGROUND

The Tripod Holder is configured of two supports, the first support to hold the tripod base and the second support to hold the tripod's three legs, and both supports are secured to the chest. The first support is configured at a 10-degree angle from the side of the chest and has a hole in which one of the tripod base's bolts can be used to secure the base to first support. The second support is spaced apart from the side of the chest about 19 to 20" inches and has a top configured to hold the tripods three legs at several contact points. The tripod legs are held in place with a strap. One standard telescope tripod is for the Celestron 8SE (and 6SE and 4SE).

BRIEF DESCRIPTION OF DRAWINGS

There are four drawings:
1. FIG. 1 shows support 1, that intends to hold the Tripod Base;
2. FIG. 2 shows support 2, that intends to hold the Tripod Legs;
3. FIG. 3 shows the placement of support 1 and support 2 inside of the chest;
4. FIG. 4 shows the placement of support 1 and support 2 with the tripod secured.

DETAILED DESCRIPTION

Tripod Holder consists of two supports. Support 1 is a planar board as depicted in FIG. 1 and configured anchored to the chest, usually with an additional board glued to the side (not shown), and configured at a 10-degree angle from the chest's side to which it is anchored (seen in FIG. 3). Support 1 is configured in dimensions of 11.5" high with an angle configured toward the support's base with the lower portion being 6" wide. Support 1 has a fixed T-nut (not shown) attached to the back of a hole 3 at 2" from the top and 2.75" from the left side of support 1. Support 1 also has a hole 4 configured at 5" from the top and 4.25" from the left side that is configured to receive a tripod base's center teat (teat usually helps center the tripod base to the scope mount). Utilizing the tripod base's own bolt (10 in FIG. 4, usually ⅜" that secures the tripod's base to the scope mount), support 1 is configured to allow the bolt into hole 3 and thus screw into a T-nut affixed from the back of support 1.

FIG. 2 shows support 2 configured as made of a planar ¾" plywood board (or similarly sturdy material, aluminum, or plastic) and is glued/screwed to the bottom and back of the chest (perpendicular to the bottom as seen in FIG. 3); an extra 2"×4" piece (8 in FIG. 3) can be added to strengthen support 2. Support 2 is 11" high by 6" wide and shaped to allow the three tripod legs to rest at multiple contact points: first leg at points 5, second leg at points 6, and the third leg at point 7; these multiple points allow the tripod's three legs to be secured naturally with a strap (seen as 12 in FIG. 4) without any undue stress upon the legs themselves.

FIG. 3 shows the placement of support 1 configured at a 10-degree angle from the right side of the chest, and an additional board may be glued to its right side. Support 1 is shown at a side view with hole 3 configured to take one of the tripod base's bolts (not shown) and screwed into the T-nut (not shown) affixed from the back of the support 1. FIG. 3 also shows hole 4 that is configured to avow a tripod base's center teat to enter when the base is secured to support 1 by the tripod base's bolt. The placement of support 2 is configured at about 19" to 20" from the right wall of the chest, and glued/screwed to the bottom and back, and may be further supported in a number of ways, perhaps as configured with a 2"×4" board 8 glued/screwed to support 2 and glued/screwed to the bottom and back of the chest.

FIG. 4 shows a tripod in place configured upon supports 1 and 2, with its base 9 secured to support 1 with the tripod base's bolt 10 configured to secure the base to support 1 through the hole 3 (shown in FIGS. 1 and 3) screwed into the T-nut (not shown) affixed from the back of the support 1. FIG. 4 shows support 2 configured as holding the three tripod legs 11, each leg making contact at theft respective points of 5, 6, 7 as seen in FIG. 2 of support 2. An extra support 8 is shown configured as a 2"×4" board glued/screwed to support 2 and to the bottom and back of the chest. The legs are secured with a strap 12.

The invention claimed is:

1. A device for holding a tripod that comprises a tripod base with a bolt, a center teat and three legs, the device comprising:
    a chest,
    a first support and a second support spaced apart within the chest,
    wherein the first support is a planar board comprising a first hole and a second hole, the first support mounted at a 10-degree angle from a side of the chest, the first hole configured to receive the tripod base bolt, and the second hole configured to receive the tripod base center teat,
    wherein the second support is a planar board with first, second, and third contact portions configured to hold the three legs of the tripod respectively.

2. The device for holding a tripod according to claim 1, wherein the second support is perpendicular to a bottom of the chest.

3. The device for holding a tripod according to claim 1, wherein a strap secures the tripod's legs.

4. The device for holding a tripod according to claim 1, wherein the first and second contact portions are defined on upper edges of the second support.

5. The device for holding a tripod according to claim 1, wherein the third contact portion is defined on a side edge of the second support.

6. The device for holding a tripod according to claim 5, wherein the third contact portion is curved.

* * * * *